US010949285B2

(12) United States Patent
Cheriton

(10) Patent No.: US 10,949,285 B2
(45) Date of Patent: Mar. 16, 2021

(54) MATCHSET-BASED AUTOMATIC ROOT CAUSE ANALYSIS INCLUDING DETERMINING A FIRST FAULT SCENARIO IS TO BE SUBSUMED BY A SECOND FAULT SCENARIO

(71) Applicant: OptumSoft, Inc., Menlo Park, CA (US)

(72) Inventor: David R. Cheriton, Palo Alto, CA (US)

(73) Assignee: OptumSoft, Inc., Menlo Park, CA (US)

( * ) Notice: Subject to any disclaimer, the term of this patent is extended or adjusted under 35 U.S.C. 154(b) by 185 days.

(21) Appl. No.: 16/358,513

(22) Filed: Mar. 19, 2019

(65) Prior Publication Data

US 2019/0294486 A1     Sep. 26, 2019

Related U.S. Application Data

(60) Provisional application No. 62/645,656, filed on Mar. 20, 2018.

(51) Int. Cl.
*G06F 11/07* (2006.01)
*G06F 16/248* (2019.01)
*G06F 16/2455* (2019.01)

(52) U.S. Cl.
CPC ........ *G06F 11/079* (2013.01); *G06F 11/0751* (2013.01); *G06F 16/248* (2019.01); *G06F 16/24558* (2019.01); *G06F 11/0766* (2013.01); *G06F 11/0775* (2013.01)

(58) Field of Classification Search
CPC ............... G06F 11/079; G06F 11/0775; G06F 11/0766; G06F 16/248; G06F 16/24558
See application file for complete search history.

(56) References Cited

U.S. PATENT DOCUMENTS

| 6,560,736 | B2 | 5/2003 | Ferguson | |
|---|---|---|---|---|
| 8,166,351 | B2* | 4/2012 | Slutsman | G06F 11/079 |
| | | | | 714/48 |
| 2011/0154091 | A1* | 6/2011 | Walton | G06F 11/0766 |
| | | | | 714/2 |
| 2011/0208680 | A1 | 8/2011 | Bovey | |
| 2014/0019814 | A1* | 1/2014 | McNairy | G06F 11/263 |
| | | | | 714/49 |

(Continued)

FOREIGN PATENT DOCUMENTS

WO      2012138983      10/2012

*Primary Examiner* — Joseph O Schell
(74) *Attorney, Agent, or Firm* — Van Pelt, Yi & James LLP

(57) ABSTRACT

A set of observed symptoms of a physical system is received. The set of observed symptoms is matched with a database of fault scenarios to generate a plurality of matched fault scenarios, wherein the database of fault scenarios comprises combinations of symptoms and corresponding root cause identifiers. The plurality of matched fault scenarios are refined. It is determined whether a first fault scenario of the plurality of matched fault scenarios is to be subsumed by a second fault scenario. In response to a determination that the first fault scenario of the plurality of matched fault scenarios is to be subsumed by a second fault scenario, the second fault scenario is included in the plurality of matched fault scenarios, the first fault scenario is deprioritized, or both. The plurality of matched fault scenarios as potential root causes is output.

44 Claims, 9 Drawing Sheets

(56) References Cited

U.S. PATENT DOCUMENTS

2014/0282426 A1\* 9/2014 Kirshenbaum ....... G06F 11/079
                                                        717/128
2019/0163551 A1\* 5/2019 Cheriton ............. G06F 11/0709
2019/0340048 A1\* 11/2019 Brown .................. G06F 11/079

\* cited by examiner

MATCHSET-BASED AUTOMATIC ROOT CAUSE ANALYSIS INCLUDING DETERMINING A FIRST FAULT SCENARIO IS TO BE SUBSUMED BY A SECOND FAULT SCENARIO

CROSS REFERENCE TO OTHER APPLICATIONS

This application claims priority to U.S. Provisional Patent Application No. 62/645,656 entitled MATCHSET-BASED AUTOMATIC ROOT CAUSE ANALYSIS filed Mar. 20, 2018 which is incorporated herein by reference for all purposes.

BACKGROUND OF THE INVENTION

Determining the root cause of problems in complex systems is challenging for several reasons.

First, a fault may propagate to cause a high density of symptoms, each one appearing as a fault or misbehavior of some component. For example, a low-level computer network link failure may cause loss of signal at each end of the link, interruption of data flow at the transport layer, and then application-level timeouts and errors.

Second, there is uncertainty associated with information available. For example, a temperature sensor may indicate a warm reading for a refrigerated area that is supposedly being cooled, suggesting that the refrigeration system has failed. However, it is also possible that the sensor has failed and is providing an incorrect reading. Furthermore, a sensor or reporting device can fail or not be reachable so the associated telemetry is not available.

Finally, the information that is available may not be sufficient to disambiguate between two or more potential root cause failures, even if only one failure is actually present. That is, not only it is necessary to filter out extraneous failures that are caused by the root cause but also it is necessary to do so when it is uncertain about how correct, current or complete the telemetry is on the system being diagnosed.

With these challenges, determining with absolute certainty what an actual root cause is may not be possible.

BRIEF DESCRIPTION OF THE DRAWINGS

Various embodiments of the invention are disclosed in the following detailed description and the accompanying drawings.

DETAILED DESCRIPTION

Figure 1:
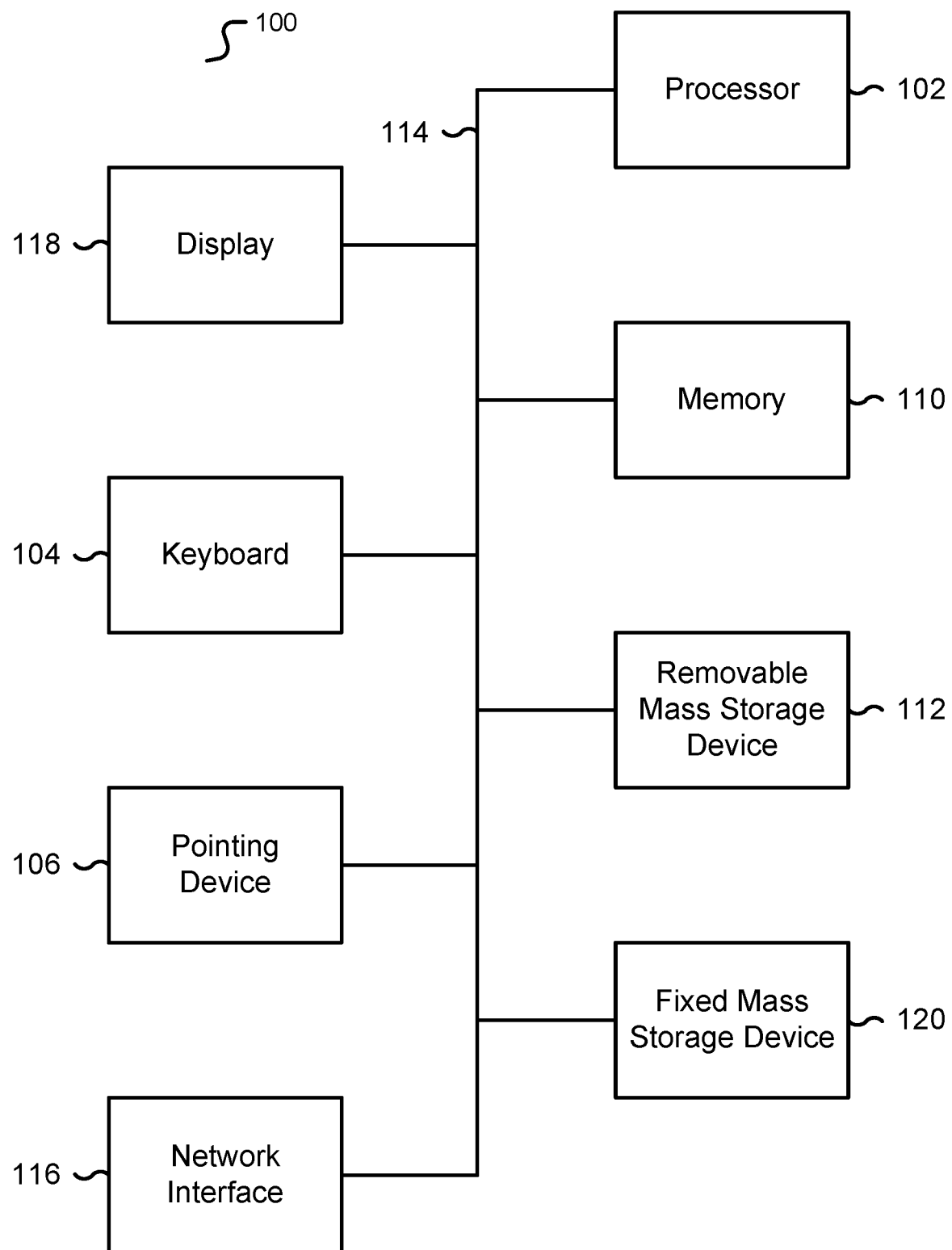
FIG. 1 is a functional diagram illustrating a programmed computer/server system for matchset-based automatic root cause analysis in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Identifying the most probable root cause or root causes of a problem in complex systems is disclosed. As described above, it may be impossible to determine with absolute certainty what an actual root cause may be, and so a useful solution is to identify a most probably root cause.

Refining an automatic root cause analysis (ARCA) that provides multiple match capability is disclosed. By exploiting the fact that multiple match capability is at least somewhat redundant, the multiple matches for a given symptom set are refined based on relationships between at least one of the following: symptoms of matches, identity of matches, and confidence levels of matches. These relationships may indicate refinement via at least one of the following: subsuming base scenarios by their associated derived scenarios; determining two matches as alternative explanations and/or indicating the matches as part of a same root cause group; and determining two matches as separate possible faults and/or indicating the matches as part of different root cause groups. Thus, techniques for allowing partial matches are disclosed. Processing the extra matches to reduce and organize matches to make it easier to efficiently interpret is disclosed.

The techniques disclosed generalize in a broader rule-based system technology. Technically, a "rule" in computing is expressed as: condition→action. Thus, ARCA is just the condition being a collection of symptoms, and the action being: "report the associated root cause". More specifically, the condition is the conjunction of "subconditions", namely "has symptom A and not symptom B", etc.

For example, indexing is central to improving the performance of database queries. If a query condition specifies a subcondition that is handled by an index, the query processor can access the index and just iterate over those records indicated to be relevant by the index, matching the rest of the query condition, rather than doing a full table scan. The latter incurs a cost that is O(N), where N is the number of rows in the table. If the index contains K entries, where K is much smaller than N, the scan of the K entries is much faster than scanning all N entries because there are fewer records to examine and also because the query condition is reduced by the subcondition being handled by the index. Moreover, if each record is B bytes in length on average, a full scan typically incurs N*B bytes of I/O or memory access, if the data is in memory, whereas the index reduces this I/O or memory requirement significantly.

An indexing mechanism may then be structured as a table of indexes that is optimized for efficient full scan while performing multiple index matches as part of this scan. In particular, each column represents an index. A row contains the entry values for each of the indexes for the corresponding row in the data table. For example, the value of subcondition X in row M is the value for index corresponding to X for the data table row M. The value is allowed to be NULL, representing "don't care" or "not known". A match mechanism takes as input an index table and index row mask, where this mask specifies a value per index, and returns the list of rows that match this mask. The mask can also specify a NULL value for an index, indicating "not known". The collection of indices are pivoted into a table, rather than each being treated as a separate (associative) array of values.

The term subcondition is the interpretation of the value of an index because it is more general than just indexing on the specific value in a column. For example, a true value in an index can just indicate that the corresponding entry in the corresponding row of the table is over a specified threshold. Also, a subcondition such as being over a given threshold may be sufficient for the application, and be changing far less frequently than the actual value. Using this terminology, a row of the index table contains a subcondition value for each index subcondition for the table row corresponding to this index table row (although the subcondition value can be NULL).

In one embodiment, the index table has N rows if there are N rows in the original table. Otherwise, if a row in the original table has no corresponding row in the index table, it can only be found in a query by doing a full table scan. In essence, the approach of scanning an N-entry index table rather than using multiple indexes to avoid a full table scan is disclosed. The index table is optimized to make it more efficient to scan than to scan the original underlying data table. That is, the emphasis is on optimizing the index table scan, rather than avoiding an N-row data table scan by the use of conventional index schemes. The key focus is on applications in which the sparseness of the data table makes it more efficient to use an index table than use conventional indexes.

Thus, relative to ARCA, the index table corresponds to the collection of potential fault scenarios, one potential fault scenario per row. A symptom corresponds to a subcondition entry in the table. For example, with a data table consisting of a row per oven in a factory and an entry corresponding to the temperature of the oven, an index corresponding to "temperature over threshold" would have entries set to true in the column in the index table corresponding to this subcondition for each row in which the corresponding oven is over the temperature threshold. Thus, the entries in the set of potential fault scenarios for a given symptom correspond to an index, and thus a column, in the index table. The output causes in ARCA correspond to the matched rows in the index table embodiment. The actual fault scenario corresponds to the mask in the index table embodiment. And, the NULL value is the special value that corresponds to "don't care" or "not known", as NULL is the term conventionally used in database literature. With this translation of terms, the matching method is the same as in ARCA except the match logic is reversed between the mask and row in the query usage.

In one embodiment, one or more of the indexes in the table are bitmap indexes, extended with the capability to indicate a "don't care" value as well as true and false. This corresponds to ternary or quaternary matching. The minimal representation for ternary or quaternary representation and matching is thus two bits. Without limitation, the example of root cause analysis is given herein, but any person of ordinary skill in the art recognizes root cause analysis is a specific application of the index table. In particular, root cause analysis can be regarded as being realized as a query to the index table to determine the row(s) that match the set of symptoms specified in an index row mask, and then mapping each of the rows to a corresponding root cause.

FIG. 1 is a functional diagram illustrating a programmed computer/server system for matchset-based automatic root cause analysis in accordance with some embodiments. As shown, FIG. 1 provides a functional diagram of a general purpose computer system programmed to provide matchset-based automatic root cause analysis in accordance with some embodiments. As will be apparent, other computer system architectures and configurations may be used for matchset-based automatic root cause analysis.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

Input Probabilities Versus Output Probabilities.

A traditional approach, used with Bayesian networks and machine learning, is to associate probabilities with the inputs, and pass these probabilities through a computational network to compute the output with the highest probability. For example, a temperature sensor may be considered over threshold with some probability P and under threshold by the complement probability 1-P, where P reflects the uncertainty that the sensor is not reporting the current temperature.

There are several problems in associating probabilities with inputs.

First, these input probabilities are not known and perhaps not practically knowable, given they may depend on many factors, including the age of the component, the way it was installed and the make/model of the component. This is particularly problematic in ARCA due to reasonably infrequent failure events. For example, it may be infeasible to have data on how frequently a given make and model of temperature sensor fails such that it reports an incorrect temperature crosses the threshold for that set for a particular system, given this event may only be detected by having one or more redundant temperature sensors with which to compare the normal or in-service temperature sensor. That is, it would require a second monitoring device per sensor and record the frequency with which is discrepancy arose, an expensive redundancy not done often in practice.

Second, different inputs are often not completely independent because there may often be a dependence or correlation between different inputs given they are part of the same system under diagnosis. This dependence could be expressed in probabilities as a conditional probability between two inputs. However, such a conditional probability is even more difficult to know, given it involves samples across a pair of elements. Moreover, the actual conditional probability may vary over time and/or space based on various factors, including the actual values of the different sensor values, the age of the system, its mode of operation and so on.

Finally, the output of such systems is generally provided as the root cause with the highest probability, as computed from these input probabilities, and thus is a single root cause, given only one may have the highest probability. In fact, these probabilistic computations may generate a large number of potential diagnoses, and rank them by probability. However, it is not clear how to filter these diagnoses sensibly based on computed probabilities, given the difficulties with using input probabilities mentioned earlier. For instance, if the operator only considers potential root causes with probability greater than 0.7, a reasonable concern is to ask how a user may have confidence that the actual root cause has at least that probability. That is, how may a user reason that this particular threshold is the right one to include the actual root cause without arbitrary numbers or requiring repetition to gain a manual, qualitative intuition for the system.

A manual approach to root cause analysis traditionally uses qualitative evaluation of symptoms and human "common sense" so is not very adaptable to an automated root cause analysis system. Similarly, these manual "by hand" approaches lack a computational framework for dealing with uncertainty, further making them difficult to automate.

An example of a traditional ARCA is DellEMC's SMARTS program, which may apply probabilities on input. It does not appear to generate multiple root cause matches, when it may use the closest match based on Hamming distance. The use of a Hamming distance would typically give only one top match except for ties. Given the use of a Hamming distance as an arbitrary measure, it is not necessarily clear what semantics or value to attach in relativity to the second-closest match, third closest match, and so on.

An efficient automated means to generate a set of likely root cause failures that correspond to the symptoms of the system under diagnosis is disclosed. A multiplicity of potential fault scenarios being specified and/or pre-specified is disclosed. As referred to herein, a potential fault scenario may correspond to a set of symptoms that are expected when a given fault in the system occurs. As referred to herein, a symptom is an observable value or value range, or value computable from observable values relevant to identifying a fault or counter-indicative to a fault. Unlike SMARTS which may apply probabilities on input, the disclosed techniques associated probabilities with output, expressed for example as confidence levels. As referred to herein, a confidence level for a potential fault scenario is the probability for the scenario fault in the system given the set of symptoms of the potential fault scenario. In some embodiments, historical data is analyzed to construct a symptom set-to-confidence level mapping table. The symptom set is looked up in the mapping table to obtain the corresponding confidence level. Other techniques for determining a confidence level given a symptom set can be used.

For example, a symptom may be "loss of signal" being reported by a computer network switch on a particular one of its interfaces. When the monitoring of the system detects a set of symptoms from the actual system being monitored, referred to herein as an actual fault scenario, this actual fault scenario is matched against the set of potential fault scenarios, to produce what is referred to herein as a matchset for this actual fault scenario, with a potential fault scenario being a member of a matchset if it is matched to the actual fault scenario.

This matchset may then be refined based on attributes of the matching potential fault scenarios and other information. As referred to herein, attributes include any information and/or relationships related to the matching potential fault scenarios such as relationships between symptoms of matches, identity of matches, and/or confidence levels of matches. The root cause faults associated with the entries in the refined matchset may then be output, constituting the result of the root cause analysis. This root cause analysis may produce a set of potential root causes more likely to include the actual root cause fault or root cause faults.

Network Example—Multiple Potential Fault Scenario.

Figure 2:
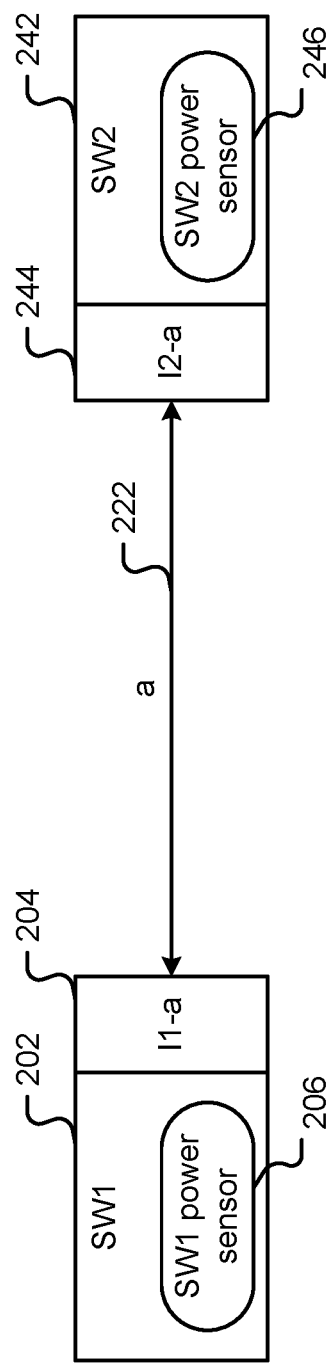
FIG. 2 is a block diagram illustrating an embodiment of a network example.

FIG. 2 is a block diagram illustrating an embodiment of a network example. In the example, a symptom of the current symptoms for a network is "loss of signal" being reported by a computer network switch on a particular one of its interfaces.

This switch SW1 (202) comprises a network interface I1-a (204) and power sensor (206) to sense a loss of power to switch SW1. The network interface I1-a (204) is coupled to link a (222) to switch SW2 (242), wherein switch SW2 likewise comprises network interface I2-a (244) and power sensor (246). Not shown in FIG. 2 may also be power sensors for the network interfaces (204, 244) if they are discretely powered.

The actual fault scenario of a "loss of signal" being reported by SW1 (202) on interface I1-a (204) may match to a fault scenario FS1 corresponding to there being a link failure in link a (222) between switch SW1 (202) and switch SW2 (242). However, the same symptoms may also match to a fault scenario FS2 in which the two interfaces (204, 244) at either end of the link have failed at the same time. It may also match to a fault scenario FS3 corresponding to the link failure in link a (222), but without ancillary symptoms considered, such as the symptoms corresponding to power loss at SW1 sensor (206) and SW2 sensor (246) being known to be false. Consequently, in this example, the matchset consists of FS1, FS2 and FS3. A tabular expression of this is:

| Label/Metadata | Symptoms | Root Cause |
|---|---|---|
| FS1 | Loss of signal on (204) & no power loss at (206) & no power loss at (246). | Link a (222) failure |
| FS2 | Loss of signal on (204) & no power loss at (206) & no power loss at (246). | Both interfaces (202, 244) failed at same time. |
| FS3 | Loss of signal on (204). | Link a (222) failure |

Subsuming Base Scenarios by their Associated Derived Scenarios.

In one embodiment, an attribute of a potential fault scenario indicates when one potential fault scenario FSa is subsumed by another potential fault scenario FSb. That is, whenever FSb is matched, FSa would also be matched. As referred to herein, FSa is a base scenario and FSb is a derived scenario. In the case that both FSa and FSb are matched, a refinement of the matchset is to remove FSa from the matchset before translating the fault scenarios to their associated root causes.

To illustrate this case, the match refinement step would recognize, continuing the Network Example of FIG. 2, that FS3 is subsumed by FS1 because FS3 is requiring matching only a subset of the symptoms that FS1 is requiring.

| Label/Metadata | Symptoms | Root Cause Identifier |
|---|---|---|
| FS1 (derived scenario) | Loss of signal on (204) & no power loss at (206) & no power loss at (246). | Link a (222) failure |
| FS2 | Loss of signal on (204) & no power loss at (206) & no power loss at (246). | Both interfaces (202, 244) failed at same time. |
| ~~FS3~~ (base scenario subsumed by FS1) | ~~Loss of signal on (204).~~ | ~~Link a (222) failure~~ |

Another simple example of a base scenario being subsumed by a derived scenario is a medical example:

a potential fault scenario FSm shows a root cause of flu given the symptoms of high body temperature and aches with an 80% confidence level; and a potential fault scenario FSn shows a root cause of flu given the symptoms of high body temperature, aches, and headache with a 90% confidence level.

| Label/Metadata | Symptoms | Root Cause Identifier | Confidence Level |
|---|---|---|---|
| FSm (base scenario) | High body temperature & aches | Flu | 80% |
| FSn (derived scenario) | High body temperature & aches & headache. | Flu | 90% |

Thus, with an actual fault scenario including symptoms of high body temperature, aches, and headache, FSm is recognized as a base scenario subsumed by a derived scenario, FSn, and thus a root cause of flu with a 90% confidence level is output.

| Label/Metadata | Symptoms | Root Cause Identifier | Confidence Level |
|---|---|---|---|
| ~~FSm (base scenario)~~ Subsumed by FSn | ~~High body temperature & aches~~ | ~~Flu~~ | ~~80%~~ |
| FSn (derived scenario) | High body temperature & aches & headache. | Flu | 90% |

Combination of Output Probabilities.

In one embodiment, a refinement may recognize that two potential fault scenarios that are present in the matchset are actually two different set of symptoms for the same root cause, and in fact may both be true, so the output contains that potential root cause, possibly with an associated probability that is a combination of the probabilities of the two potential fault scenarios. For example, FSn may be a potential fault scenario showing a root cause of flu given symptoms of high body temperature, aches, and headache with a 90% confidence level and FSp may be a potential fault scenario showing a root cause of flu given symptoms of runny nose and ear aches with a 5% confidence level.

| Label/Metadata | Symptoms | Root Cause Identifier | Confidence Level |
|---|---|---|---|
| FSn | High body temperature & aches & headache. | Flu | 90% |
| FSp | Runny nose & ear aches. | Flu | 5% |

A patient with symptoms of high body temperature, aches, headache, runny nose, and ear aches may be recognized as a combination with an associated probability being a combination of the 90% confidence level and 5% confidence level. In one embodiment, the confidence levels may be linearly summed.

| Label/Metadata | Symptoms | Root Cause Identifier | Confidence Level |
|---|---|---|---|
| FSn | High body temperature & aches & headache. | Flu | 90% |
| FSp | Runny nose & ear aches. | Flu | 5% |
| Combination (FSn, FSp) | High body temperature & aches & headache & runny nose & ear aches. | Flu | 95% |

Alternative Explanations.

In one embodiment, an attribute of a potential fault scenario indicates when one potential fault scenario FSc is an alternative possibility to another potential fault scenario FSd. Thus, when both FSc and FSd occur in the matchset, the refinement would indicate these as part of a subset of alternative potential root causes for the actual fault scenario, as opposed to indicating the two matches as two separate possible faults and/or indicating the two matches as part of different root cause groups. In an embodiment, the attribute indicating a potential root cause as an alternative can be computed by comparing the symptoms of the two potential root causes. It is an alternative has a subset of the symptoms of the other potential root cause and it is not a base root cause of same, it is an alternative.

For example, using the Network Example of FIG. 2, refinement would indicate FS1 and FS2 as alternatives to each other, given that both scenarios correspond to a common set or subset of symptoms.

| Label/Metadata | Symptoms | Root Cause Identifier |
|---|---|---|
| FS1 (derived scenario) | Loss of signal on (204) & no power loss at (206) & no power loss at (246). | Link a (222) failure |
| FS2 (alternative explanation to FS1) | Loss of signal on (204) & no power loss at (206) & no power loss at (246). | Both interfaces (202, 244) failed at same time. |

Another simple example of an alternative explanation is a medical example:

a potential fault scenario FSn shows a root cause of flu given the symptoms of high body temperature, aches, and headache with a 90% confidence level; and a potential fault scenario FSq shows a root cause of hayfever given symptoms of high body temperature, aches, and headache with a 3% confidence level;

| Label/Metadata | Symptoms | Root Cause Identifier | Confidence Level |
|---|---|---|---|
| FSn | High body temperature & aches & headache. | Flu | 90% |
| FSq | High body temperature & aches & headache. | Hayfever | 3% |

Thus with an actual fault scenario including symptoms of high body temperature, aches, and headache, FSq is recognized as an alternative explanation to FSn.

| Label/Metadata | Symptoms | Root Cause Identifier | Confidence Level |
|---|---|---|---|
| FSn | High body temperature & aches & headache. | Flu | 90% |
| FSq (*alternative explanation to FSn*) | High body temperature & aches & headache. | Hayfever | 3% |

In one embodiment, another attribute of a potential fault scenario is the probability of this fault scenario relative to its associated alternative fault scenarios. To illustrate, using the Network Example of FIG. 2, the probability of FS1 may be 0.95 and the probability of FS2 as an alternative to FS1 may be assigned 0.05. The matchset refinement may then order the associated root causes according to the probabilities associated with each of the alternatives. Thus, in the Network Example of FIG. 2, the refined root cause set may be:
 [RC1:0.95, RC2:0.05]
wherein RC1 corresponds to the root cause associated with fault scenario FS1 and RC2 corresponds to the root cause associated with fault scenario FS2. The refinement eliminates a third entry because FS3 is subsumed by FS1.

| Label/Metadata | Symptoms | Root Cause Identifier | Confidence Level |
|---|---|---|---|
| FS1 (derived scenario) | Loss of signal on (204) & no power loss at (206) & no power loss at (246). | Link a (222) failure | 95% |
| FS2 (alternative explanation to FS1) | Loss of signal on (204) & no power loss at (206) & no power loss at (246). | Both interfaces (202, 244) failed at same time. | 5% |

Associating probabilities with the potential fault scenarios may be more feasible than the input probabilities approach because each fault scenario represents a situation in which a top-level failure requires remediation. Therefore, operational data may indicate the frequency with which a given root cause occurred compared to that of the alternatives, namely those with the same symptoms. For example, resuming Network Example of FIG. 2, if a broken link a (222) is the actual root cause 95 out of 100 times that the associated symptoms were observed, and only 5 out of those 100 times was it the case that it was actually the two interfaces (204, 244) failing at the same time, recorded operational data provides the basis of weighting and ordering these two alternative root causes with these probabilities.

Therefore, remedial action that first treats the output result as detecting a broken link a (222) would immediately address the actual root cause failure most of the time, and only 5 percent of the time, would require going to the alternative fault remedial action. In some cases, such as the case of simultaneous failure of two interfaces (204, 244), a user may estimate the probability based mean time to repair for an interface and the frequency of an individual interface failing and the number of interfaces, further qualifying with the likelihood that two interfaces failing within the same recovery window are actually on either ends of a link. Note that it is possible, although unlikely, that both the link has failed and the two interfaces have failed. That is, the alternative root causes may not be mutually exclusive. In this case, remedial actions for both faults are required.

Matching.

In one embodiment, the matching of an actual fault scenario to potential fault scenario, as performed by a matching mechanism, is exact in the sense that each matched potential fault scenario may be required to be such that the actual fault scenario satisfies for each symptom the symptom requirement specified in the matched potential fault scenario.

For example, if the potential fault scenario specifies a symptom Si to be the temperature of an oven being greater than 100 Celsius, the actual fault scenario should include this symptom being reported as greater than 100 Celsius.

This matching contrasts with the input probability approach used for example, in SMARTS, in which there is some probability that the symptom is true, even if the sensor is not reporting this, given the uncertainty about the sensor as captured by the associated probability. It also contrasts with the various seemingly arbitrary "distance-based" approaches such as the Hamming distance approach, in which the ARCA system is selecting a "best match" based on the distance by some metric between the actual symptoms and the symptoms associated with a root cause, analogous to a potential fault scenario.

In one embodiment, generation of the matchset is performed by the matching mechanism specified in U.S. patent application Ser. No. 15/973,847 entitled AUTOMATIC ROOT CAUSE ANALYSIS USING TERNARY FAULT SCENARIO REPRESENTATION which is incorporated herein by reference for all purposes.

The unrefined fault scenario matchset may include multiple members even with matching a single actual fault in part because the set of potential fault scenarios should cover the cases in which some telemetry is missing or wrong. For example, FS3 in the Network Example of FIG. 2 is provided so that there is some match even if telemetry for ancillary symptoms is not complete or incorrect. That is, it would be unacceptable to not be able to diagnose a link failure in link a (222) just because one (202) or the other of the switches (242) was unable to report on power (206, 246) to an interface.

In general, matching may be efficient to implement and able to match multiple independent root causes simultaneously as described in the above application regarding ternary fault scenario representation. Matching has the disadvantage that it fails to match when any specified symptom in the potential fault scenario that corresponds to the actual fault scenario does not match the symptoms determined from the telemetry. This may arise even when a human evaluation of the symptoms might quickly conclude what the root cause is.

Figure 3:
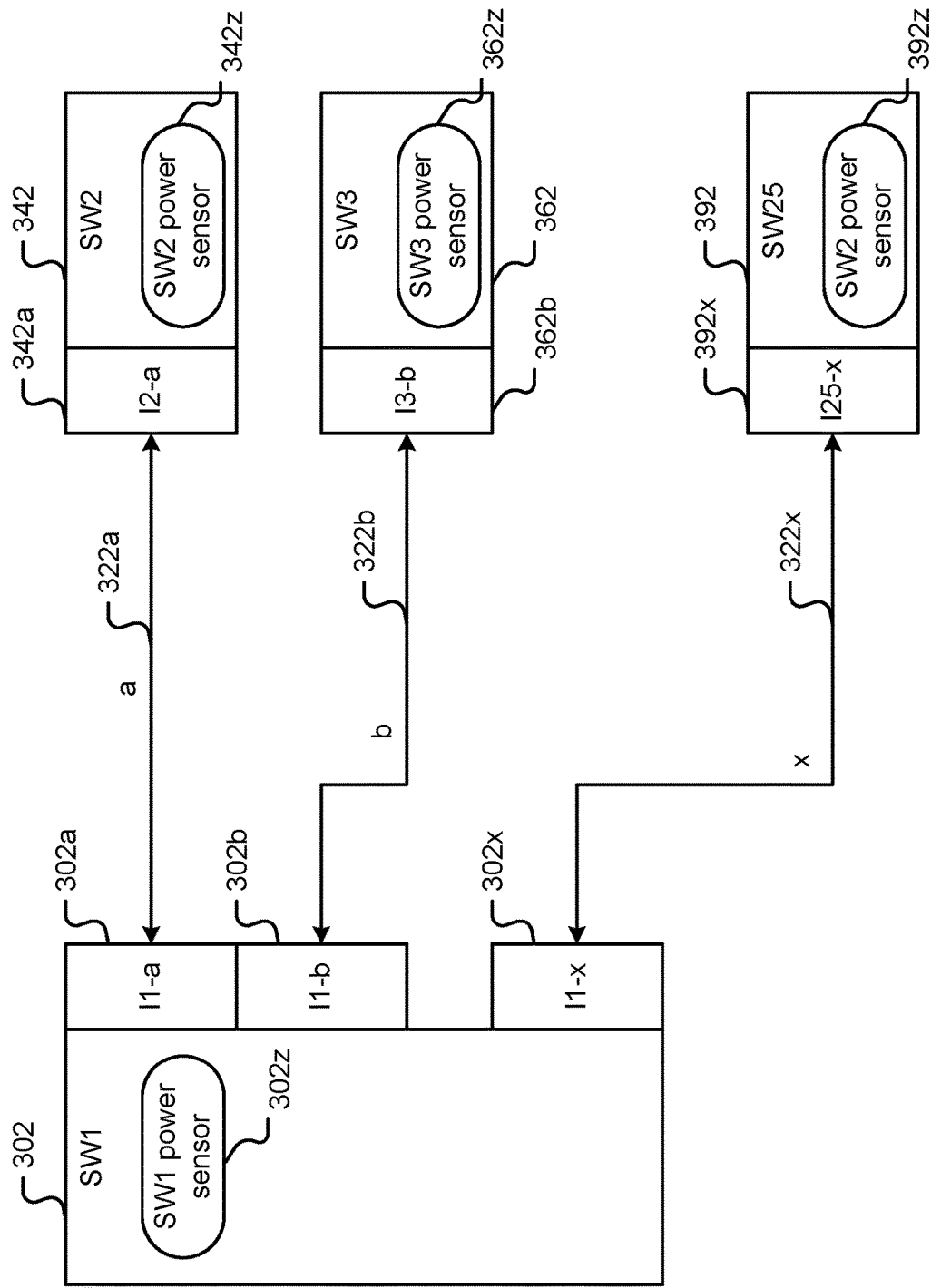
FIG. 3 is a block diagram illustrating an embodiment of a power example.

FIG. 3 is a block diagram illustrating an embodiment of a power example. In this Power Example, a switch SW1 (302) is fully coupled via interfaces and links to 24 other switches SW2 (342), SW3 (362) through SW25 (392). As shown before in FIG. 2, each switch for example switch SW1 (302) comprises a power sensor (302z) as well as one or more interfaces I1-*a* (302*a*), I1-*b* (302*b*), . . . , I1-*x* (302*x*) each corresponding to a link a (322*a*), b (322*b*), . . . , x (322*x*).

If the power to a computer network switch SW1 (302) including SW1 power sensor (302*z*) fails, one would expect that each interface to which the switch is connected over a link would detect a loss of signal. However, if the switch in question is connected over links to 24 separate interfaces I2-*a* (342*a*), I3-*b* (362*b*), . . . , I25-*x* (392*x*), but only 23 of these interfaces are reporting loss of signal and a 24th one I25-*x* (392*x*) is missing from the telemetry, matching would fail to identify a potential fault scenario that specified all 24 separate interfaces having the symptom loss of power, even though it is reasonable to conclude from the symptoms that the switch had failed, and furthermore failed due to lack of power if that switch SW1 power sensor (302*z*) reported loss of power.

The disclosed techniques in part leverage the ability of such matching to match to multiple fault scenarios at the same time in order to compensate for this disadvantage. In particular, besides having a potential fault scenario that corresponds to all the symptoms, there are potential fault scenarios specified that correspond to partial matches for the same root cause. The extension to associated attributes with potential fault scenarios allows a refinement of the matchset to reduce number of potential root causes that are actually output.

In particular, when a match to the full potential fault scenario occurs, the potential fault scenarios corresponding to partial matches of the same root cause are eliminated and/or subsumed. Similarly, the probability attribute associated with a potential fault scenario allows the output to efficiently indicate a lower confidence for a root cause in the output when it is present only because of what is effectively a partial match.

In one embodiment, another technique for allowing partial matches is the approximate matching specified in U.S. Provisional Patent Application No. 62/799,613 entitled APPROXIMATE MATCHING which is incorporated herein by reference for all purposes. For example, approximate matching is used for a case in which not all features, for example subconditions, are necessarily known. Approximate matching can thus be used in conjunction with partial matching.

In one embodiment, approximate matching is provided by specifying a distance threshold parameter and outputting rows as matching if they are within the distance threshold according some distance metric defined between a row and the mask. Processing extra matches to reduce and organize matches for efficiency in interpretation may be improved by approximate matching in part by treating an approximate match at distance D, for example, as a base root cause relative to a match at distance D-1.

Partial-Match Potential Fault Scenarios (PMPFSs).

A PMPFS is referred to herein as a potential fault scenario added to effectively handle partial matches with a matching mechanism. There are various techniques to define PMPFSs.

A PMPFS that Omits One Symptom.

First, for each full potential fault scenario for a root cause, there may be for each symptom a PMPFS that omits one of the symptoms. For example, using the Power Example of FIG. 3, there may be a PMPFS for each neighboring interface which omits this interface as a symptom or alternately designates this symptom as a "don't care". For example, a PMPFS may omit I25-*x* (392*x*) as a "don't care" and thus with I2-*a* (342*a*), I3-*b* (362*b*), . . . , I24-*w* (not shown in FIG. 3) reporting a loss of signal, the system may conclude the switch SW1 (302) has failed.

It may be possible to go further and provide a PMPFS for a subset of symptoms of the full potential fault scenario. For example, create a PMPFS for both I24-*w* and I25-*x* (392*x*) as "don't care". However, that may lead to an impractical number of PMPFSs in systems of realistic complexity. For example, in the example of a switch with 32 direct neighbor switches, there are basically 2 to the power of 32 or roughly 4 billion possible subsets. Here, approximate matching may solve the issue with excessive number of PMPFS. Put another way, partial matching may be thought of as adding extra rows that are less complete, whereas approximate match is relaxing the match criteria so one can match rows that do not exactly match the mask, or actual complete set of symptoms.

A PMPFS that Excludes a Range of Values.

One method to effectively support partial matches while avoiding an exponential explosion in the number of PMPFSs is to allow a potential fault scenario to specify a given symptom as excluding some value, or a range of values. Typically values are used that would contradict the associated fault being the root cause. In the Power Example of FIG. 3, a PMPFS may be specified as requiring the lossOfSignal symptom to be either true or not known. Then, a match occurs as long as no neighbor switch is claiming to receive a signal from the switch that has supposedly lost power. That is, the match still takes place if this symptom is not known for some of the neighbor switches, for example I25-*x* (392*x*) which was unknown.

In one embodiment, the representation of a PMPFS allows the specification of exclusion-based matches, not just inclusion, in range specifications. For example, in the referenced disclosure, the binary representation of a ternary value can use the "unknown but true" value (i.e. 01) that is otherwise unused to designate "not known to be true". In general, there exist traditional techniques for data representation that may be used to efficiently encode extra information that correspond to exclusion as well as inclusion.

Restricting Scope of a PMPFS.

Another method to effectively support partial matches while avoiding an exponential explosion in the number of PMPFSs is to restrict the scope of a PMPFS and its symptoms and corresponding reduce the probability associated with it. In the Power Example of FIG. 3, a PMPFS may be generated that matches on the current power failure sensor (302*z*) for the switch SW1 (302) and specifies "don't care" in effect for the telemetry of the neighbor switches (342*a*, 362*b*, . . . , 392*x*). This PMPFS then matches if the power sensor (302*z*) reports a power failure yet there is contradictory information from one or more neighbor switches, such as an "unknown" for I25-*x* (392*x*), which may be incorrect or stale.

On the other hand, if the above PMPFS for the same switch SW1 (302) matches with an exclusion-based match, this lower probability match is filtered out by the refinement step. In general, the generation of a PMPFS may restrict the scope based on relationship to other elements, the types of the other elements, specific properties of these elements and other attributes.

Defining an Aggregate Symptom.

Another method to effectively support partial matches while avoiding an exponential explosion in the number of PMPFSs is to define an aggregate symptom that is set based on telemetry across multiple sensor inputs. In the Power Example of FIG. 3, one may define an aggregate symptom that corresponds to more than some threshold K of neighboring switches SW2 (342), SW3 (362), . . . , SW25 (392) having loss signal from a given switch SW1 (302). Then, a PMPFS for switch loss of power may specify this aggregate symptom so that the switch has deemed to have had a power failure if most of its direct neighbors have loss signal from it. To be clear, the benefit of incorporating this information from its direct neighbors is that it helps disambiguate this case from that in which the current sensor on the switch has failed, not the power itself Back Propagation.

Another method to efficient support partial matches is to exclude from a PMPFS symptom requirements that have been determined by what is referred herein as back propagation of symptoms. In the Network Example of FIG. 2, one likely explanation for a signal not being received at the far/SW2 end (242) of link a (222) is a broken network cable. An alternative explanation for a signal not being received at the far end of the link is that the interface I1-a (204) at the near/SW1 end (202) has lost power. This is because loss of power at an interface at one end of a link (222) effectively propagates a loss of signal symptom to the interface at the other end of the link.

Using back propagation, the full fault scenario of symptoms for this scenario requires that the loss of power symptom for each interface and/or switch (206, 246) is false. However, this back propagation also means that if the current power sensor (206) for this switch SW1 is faulty, the automatic root cause analysis (ARCA) may fail to match to the full fault scenario and thus not determine the root cause unless there are matching PMPFSs. In this case, there may be a PMPFS that excludes these symptoms arising from this back propagation, typically with an associated lower probability given the uncertainty introduced by ignoring the symptoms that would otherwise be required because of the back propagation.

Combinations Using Back Propagation.

Each of the earlier techniques or methods may also be applied to back propagation, including: 1) using a subset of the back-propagated symptoms 2) using an aggregate of the back-propagated symptoms, and 3) using exclusion of symptoms values, rather than an inclusive range.

In general, PMPFSs allow an engineering trade-off between accuracy of root cause analysis and the computer memory/processing for a large number of PMPFSs. That is, computer memory requirements may be reduced and/or computer processing speed may be increased with fewer number of PMPFSs. More accurate analysis requires more compute resources than a less accurate analysis. However, beyond a point there are diminishing returns for using more PMPFSs, as the uncertainty with correctness and availability of telemetry limits the certainty of any analysis.

Using the above disclosed techniques recognizes and addresses a major fallacy in the traditional approach to ARCA; the assumption of a single root cause and the assumption that determining that the actual root cause is feasible to determine with certainty from sensor input. Sensor input may be incorrect. Generating a set of potential root causes based on matching potential fault scenarios, some of which may correspond to the same root cause fault, and then providing a refinement step to produce a curated set of potential root causes is disclosed.

Spelling Checker Analogy.

In this sense, these techniques are analogous to a spelling checker application. Such a computer program may not exactly determine root cause, just like a spelling checker may not exactly determine all the words that are spelled wrong: did the author mean to say "Hello, how ate you doing today?" when ate is correctly spelled word? However, it can dramatically reduce the set of potential faults to consider, the same as a spelling checker can reduce the number of words in a document that a person needs to verify as having the correct spelling.

The matchset approach is important for a matching approach to root cause analysis because multiple matches are essential to avoid failure to match just because of one or a small number of discrepancies. For example, if a potential fault scenario is specified for the case of a broken link with symptoms that indicate the power is intact for switches/ interfaces at the two ends of the link, a match would fail to match to a broken link if the power sensor for either of these interfaces was malfunctioning.

Figure 4:
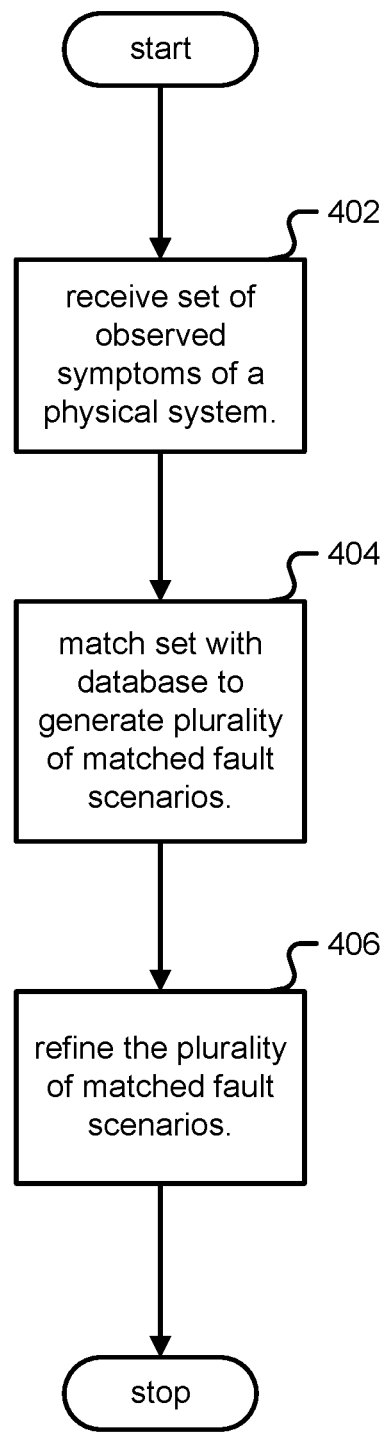
FIG. 4 is a flow chart illustrating an embodiment of a process for matchset-based automatic root cause analysis.

FIG. 4 is a flow chart illustrating an embodiment of a process for matchset-based automatic root cause analysis. In one embodiment, the process of FIG. 4 is carried out by the system in FIG. 1.

In step 402, a set of observed symptoms of a physical system is received. As referred to herein, a physical system is any system with a non-transitory component, for example a refrigeration system, a computer network, and/or a biological system like a human that may contract a disease. For example, a sensor may be associated with each element of the Network Example of FIG. 2 and the set of observed symptoms may comprise a status for each working sensor.

In step 404, the set of observed symptoms is matched with a database of fault scenarios to generate a plurality of matched fault scenarios, wherein the database of fault scenarios comprises combinations of symptoms and corresponding root cause identifiers. In one embodiment, the database of fault scenarios also comprises one or more confidence levels.

For example, the set of observed symptoms of the Network Example of FIG. 2 may include signal not being received at the far/SW2 end (242) of link a (222). This set of observed symptoms may correspond to a first matched fault scenario of a broken link a (222) and a second matched fault scenario of interface I1-a (204) at the near/SW1 end (202) losing power.

In one embodiment, matching includes adding partial-match potential fault scenarios (PMPFS) to handle partial matches with a matching mechanism.

In one embodiment, adding PMPFS comprises at least one of the following:

allowing a potential fault scenario to specify a given symptom as excluding one or more values;

allowing a potential fault scenario to restrict a scope of a PMPFS and its symptoms and correspondingly reduce probability associated with the PMPFS;

allowing a potential fault scenario to define an aggregate symptom across multiple inputs; and excluding from a PMPFS a set of back propagated symptoms.

In one embodiment, adding PMPFS comprises at least one of the following: using a subset of the back-propagated symptoms; using an aggregate of the back-propagated symptoms; and using exclusion of back-propagated symptom values.

In step 406, the plurality of matched fault scenarios are refined. Details of how to refine the matched fault scenarios are described below in connection with FIGS. 5A and 5B. As will be discussed in greater detail below, the refining comprises determining whether a first fault scenario is to be subsumed by a second fault scenario, and if so, including the second fault scenario in the plurality of matched fault scenarios, deprioritizing the first fault scenario, or both. In the examples below, the first fault scenario is one of the matched fault scenarios, and the second fault scenario can be another one of the matched fault scenarios or a fault scenario that is associated with an expression that has the first fault scenario as a parameter. As used herein, when a first fault scenario is subsumed by a second fault scenario, the first fault scenario can be changed, marked, lowered in priority, removed from the matched fault scenarios, or otherwise affected by the second fault scenario. In some embodiments, the refining further comprises associating matched fault scenarios according to relationships. In some embodiments, relationships include at least one of the following: symptom relationships, root cause identifier relationships, and confidence level relationships.

The matched fault scenarios are then output as potential root causes associated with the set of observed symptoms.

Figure 5A:
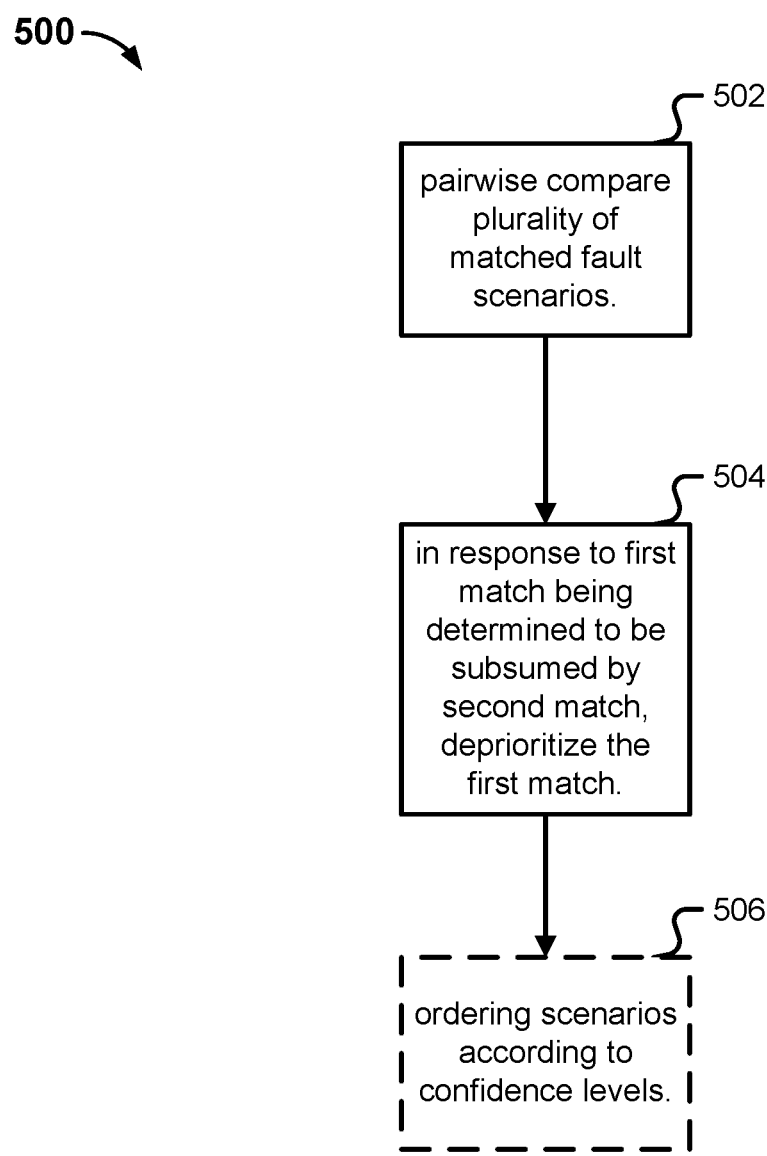
FIG. 5A is a flow chart illustrating an embodiment of a process for determining whether a first fault scenario of the plurality of matched fault scenarios is to be subsumed by a second fault scenario.

FIG. 5A is a flow chart illustrating an embodiment of a process for determining whether a first fault scenario of the plurality of matched fault scenarios is to be subsumed by a second fault scenario. In some cases, step 406 of FIG. 4 includes process 500 of FIG. 5A.

In this example, the refining of the matched fault scenarios includes determining whether a first fault scenario of the plurality of matched fault scenarios is to be subsumed by a second fault scenario, which in turn includes pairwise comparing the plurality of matched fault scenarios in step 502. For example, the broken link scenario is compared to the loss of interface power scenario. In step 504, in response to a determination that a first matched fault scenario of the plurality of matched fault scenarios is subsumed by a second fault scenario, the first matched fault scenario is deprioritized. In some embodiments, the deprioritizing includes removing the first matched fault scenario from the set of matched fault scenarios. In some embodiments, the deprioritizing includes associating the first matched fault scenario with a lower probability alternative explanation root cause. In optional step 506, refining comprises ordering the plurality of matched fault scenario according to confidence levels associated with a given matched fault scenario. In one embodiment, the plurality of matched fault scenarios are output as potential root causes that led to the observed symptoms.

In one embodiment, the first matched fault scenario is determined to be subsumed by the second matched fault scenario in the event that it is determined that the first matched fault scenario is a base scenario and a second matched fault scenario is a derived scenario from the base scenario.

In one embodiment, it is determined that the first matched fault scenario is a base scenario and a second matched fault scenario is a derived scenario from the base scenario in the event the first matched fault scenario and second matched fault scenario share a same root cause identifier and the first matched fault scenario confidence level is lower than the second matched fault scenario confidence level.

In one embodiment, refining the plurality of matched fault scenario further comprises, in the event the first matched fault scenario is determined to be an alternative explanation for the second matched fault scenario, indicating the first matched fault scenario and second matched fault scenario as part of a root cause group.

In one embodiment, it is determined that the first matched fault scenario is the alternative explanation for the second matched fault scenario in the event the first matched fault scenario and second matched fault scenario share a same or similar set of symptoms.

In one embodiment, refining the plurality of matched fault scenario further comprises, in the event the first matched fault scenario is determined to be an separate possible fault from the second matched fault scenario, indicating the first matched fault scenario and second matched fault scenario are not part of a same root cause group.

In one embodiment, it is determined that the first matched fault scenario is the separate possible fault from the second matched fault scenario in the event the first matched fault scenario and second matched fault scenario neither share a same set of symptoms nor a same root cause identifier.

Figure 5B:
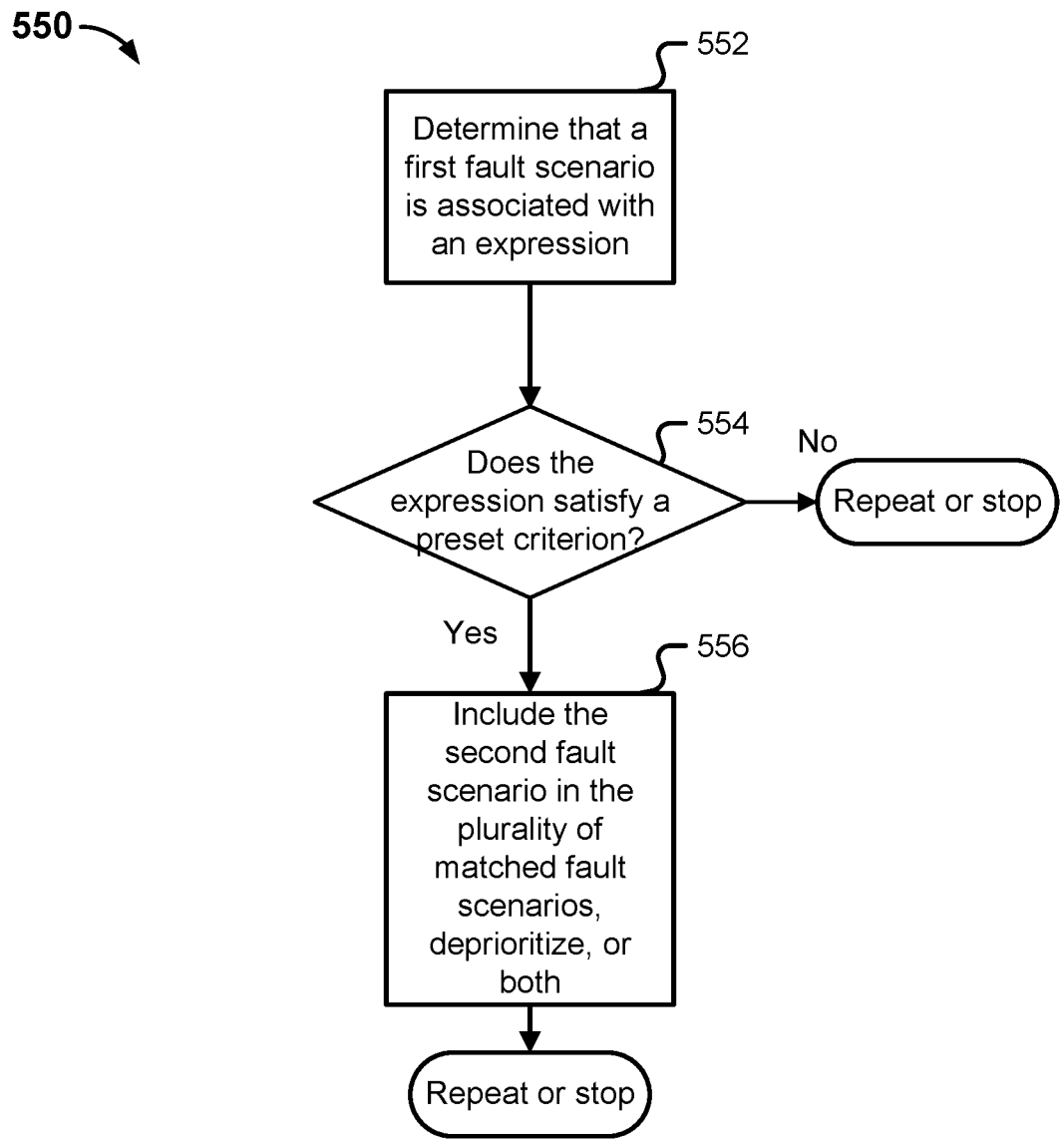
FIG. 5B is a flow chart illustrating another embodiment of a process for determining whether a first fault scenario of the plurality of matched fault scenarios is to be subsumed by a second fault scenario.

FIG. 5B is a flow chart illustrating another embodiment of a process for determining whether a first fault scenario of the plurality of matched fault scenarios is to be subsumed by a second fault scenario. In one embodiment, step 406 of FIG. 4 includes process 550.

In this example, it is assumed that prior to process 550, certain metadata is set up to be associated with individual fault scenarios. The metadata specifies, among other things, pre-defined expressions that include corresponding fault scenarios as parameters. In various embodiments, the association can be made by adding an additional field in the database to the metadata associated with the fault scenarios, by setting up pointers or references to the respective expressions from the individual fault scenarios, or by using any other appropriate techniques. The fault scenarios can be viewed as base scenarios, and the expressions can be viewed as defining corresponding derived scenarios. For example, for a fault scenario FS1 which corresponds to a root cause RC1, its corresponding metadata specifies an expression FSk=(FS1 or FS2) and (FS3 or FS4), where FS2, FS3, and FS4 are other fault scenarios that are included in the database. When FS1 is found to be a matched fault scenario through matching the observed symptoms, FS2, FS3, and FS4 each may or may not in the matched fault scenarios depending on the particular set of observed symptoms. The expression can be specified by users or system administrators, generated by a compiler based on a fault model that analyzes all the symptom-to-fault scenario mappings and determines expressions using Boolean algebra, and/or any other appropriate techniques. It is further assumed that a first fault scenario, such as a fault scenario from the matched fault scenarios, is selected.

In this example, in step 552, an expression that has a first fault scenario as a parameter and that corresponds to a second fault scenario is determined. The determination of the expression can be made by checking the corresponding metadata that stores the expression. For example, the metadata that corresponds to the first fault scenario can include the expression, or a pointer or reference to an expression object. Taking the example discussed above, for a fault scenario FS1, the expression corresponds to another fault scenario FSk, specified as: FSk=(FS1 or FS2) and (FS3 or FS4).

In step 554, it is determined whether the expression satisfies a preset criterion. In various embodiments, the preset criterion can be that the expression is true, the expression is false, the expression has a certain value, the expression exceeds a certain threshold, or the like. In some expressions, additional parameters in the expression are also determined, and the expression is evaluated in order to determine whether the expression satisfies the preset criterion. The determination can be based on, for example, the set of matched fault scenarios. In the FSk example above, the determination is based on whether FS3 or FS4 are true/exist in the set of matched fault scenarios. The parameters are applied to the expression to obtain a result, which is compared with the preset criterion (in this case, whether FSk is true).

If the expression does not satisfy the preset criterion, nothing additional needs to be done, and process 550 can repeat for the next fault scenario in the matched fault scenario set or end. If, however, the expression satisfies the preset criterion, in various embodiments, at 556, the first fault scenario is deemed to be subsumed by the second fault scenario. Continuing with the above example, given that FS1 is true, if neither FS3 nor FS4 is true, the expression for FSk does not satisfy the preset criterion that the expression be true, and the process repeats or ends. If, however, FS3, FS4, or both are true, the expression for FSk is true and the preset criterion is satisfied, and FS1 is deemed to be subsumed by FSk. Thus, FSk is included in the set of matched fault scenarios to be output, FS1 is deprioritized (removed from the matched fault scenarios or assigned a lower probability), or both. In some embodiments, FS2, FS3, or FS4 (whichever that is true) are also deprioritized. At this point process 550 can be repeated for the next matched fault scenario or end if all the matched fault scenarios have been processed.

Figure 6A:
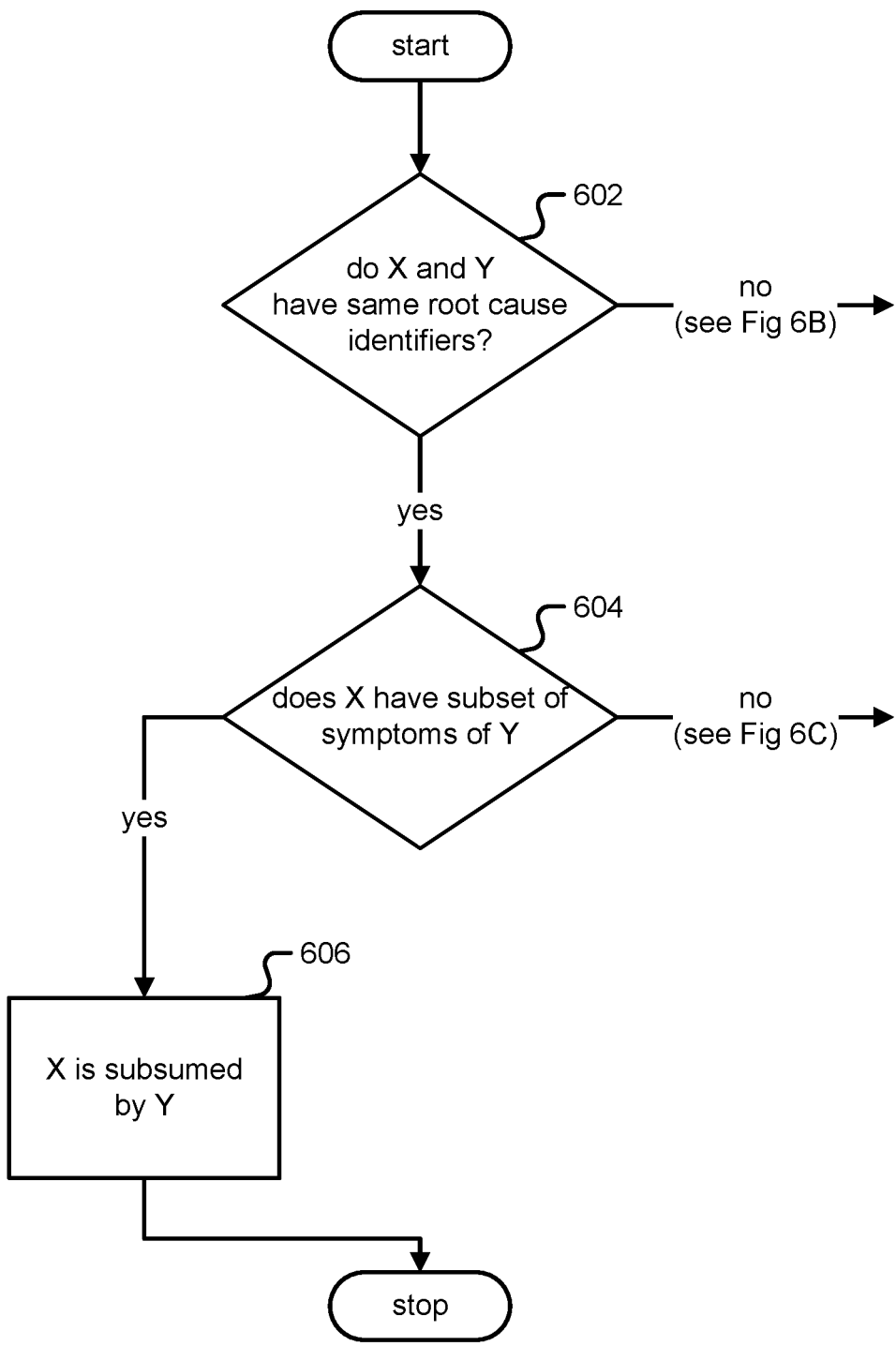
FIGS. 6A, 6B, and 6C are flow charts illustrating an embodiment of a process for refining a plurality of matched fault scenarios based on relationships.
Figure 6B:
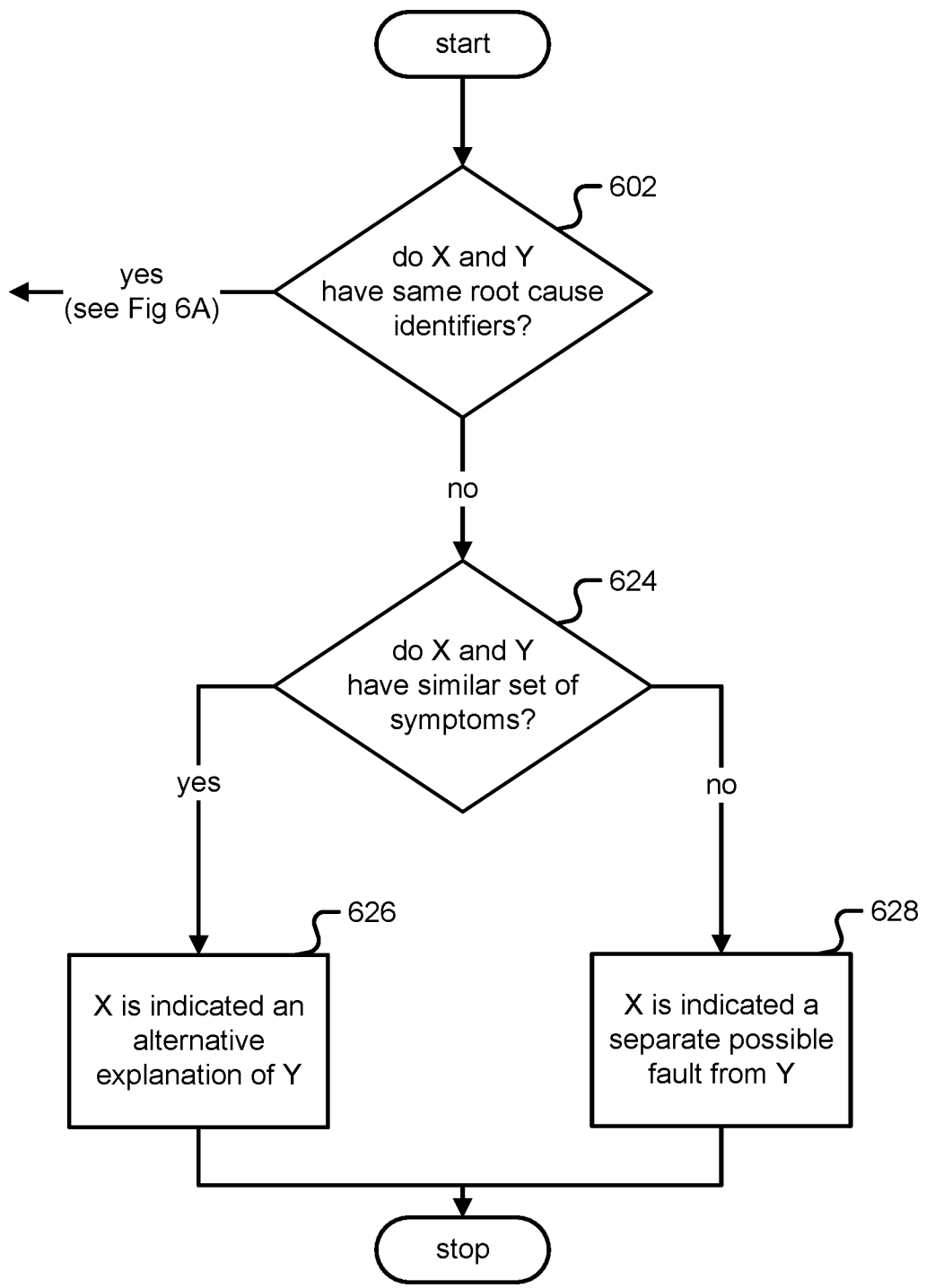
Figure 6C:
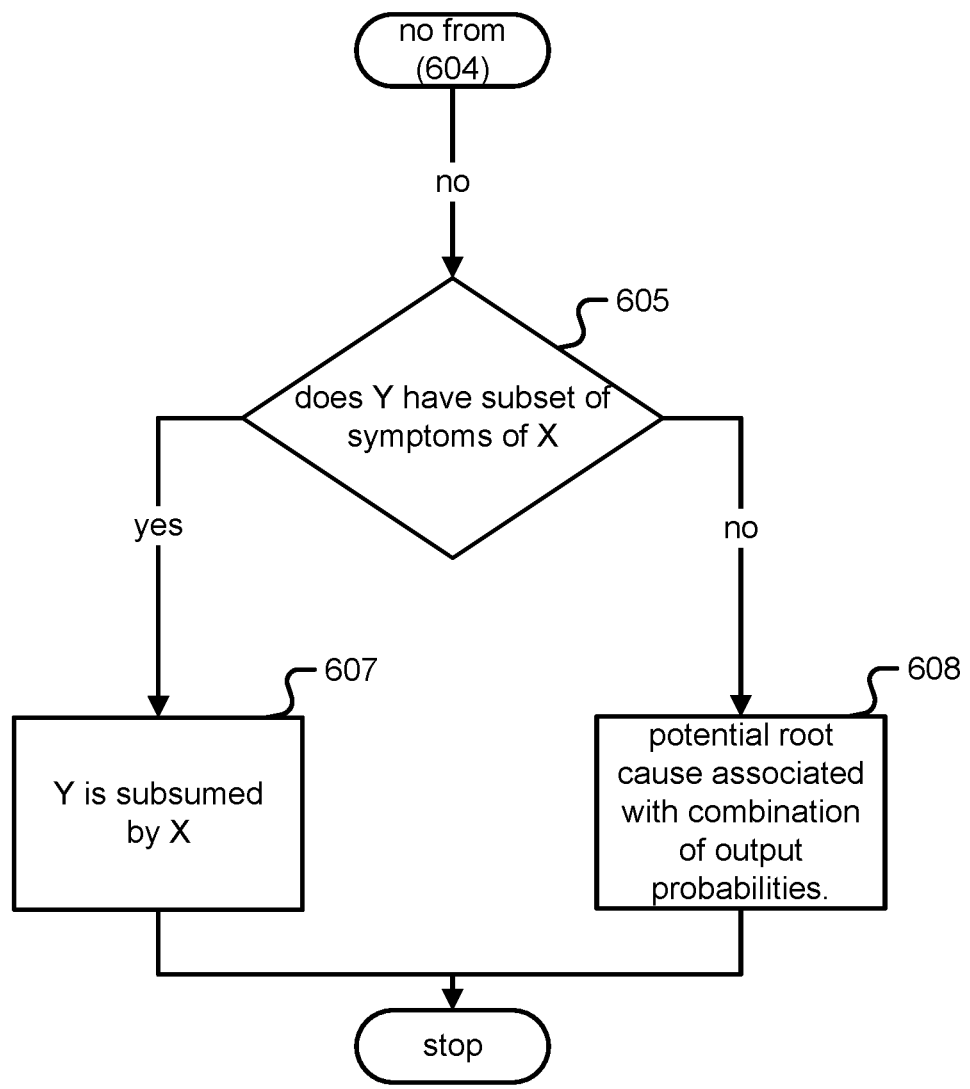

FIGS. 6A, 6B, and 6C are flow charts illustrating an embodiment of a process for refining a plurality of matched fault scenarios based on relationships. In one embodiment, step 406 of FIG. 4 includes the process of FIGS. 6A, 6B, and 6C. If it is determined in step 602 that X and Y have the same root cause identifiers, control is transferred to step 604; otherwise control is transferred to step 624.

If it is determined in step 604 that X has a subset of symptoms of Y, control is transferred to step 606 where X is indicated as being subsumed by Y; symmetrically, if not, but if Y has a subset of symptoms of X in step 605, then Y is subsumed by X in step 607; otherwise control is transferred to step 608 where it is recognized that two potential fault scenarios that are present in the matchset are actually two different set of symptoms for the same root cause, and in fact may both be true, so the output contains that potential root cause, possibly with an associated probability that is a combination of the output probabilities of the two potential fault scenarios associated with X and Y.

If it is determined in step 624 that X has the same or similar set of symptoms as Y, control is transferred to step 626 where X is indicated as an alternate explanation of Y; otherwise control is transferred to step 628 where X is indicated as a separate possible fault from Y. In that step 624, it is not necessary that X and Y have exactly the same set of symptoms, as it is known at this point they both match the actual fault scenario. It is possible that, for example, that Y has a "don't care" in an column where X has true. The actual test is that either X matches Y by ternary matching or Y matches X. Otherwise, they are separate faults, meaning there are two separate fault to remediate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor; and
    a memory coupled with the processor, wherein the memory is configured to provide the processor with instructions which when executed cause the processor to:
        receive a set of observed symptoms of a physical system;
        match the set of observed symptoms with a database of fault scenarios to generate a plurality of matched fault scenarios, wherein the database of fault scenarios comprises combinations of symptoms and corresponding root cause identifiers; and
        refine the plurality of matched fault scenarios, comprising to:
            determine whether a first fault scenario of the plurality of matched fault scenarios is to be subsumed by a second fault scenario; and
            in response to a determination that the first fault scenario of the plurality of matched fault scenarios is to be subsumed by the second fault scenario: include the second fault scenario in the plurality of matched fault scenarios, deprioritize the first fault scenario, or both include the second fault scenario in the plurality of matched fault scenarios and deprioritize the first fault scenario; and
        output the plurality of matched fault scenarios as potential root causes.

2. The system of claim 1, wherein:
    the second fault scenario is one of the plurality of matched fault scenarios; and
    to determine whether the first fault scenario of the plurality of matched fault scenario is to be subsumed by the second fault scenario includes to pairwise compare the plurality of matched fault scenarios.

3. The system of claim 1, wherein to deprioritize the first fault scenario comprises to remove the first fault scenario from the plurality of matched fault scenarios.

4. The system of claim 1, wherein to deprioritize the first fault scenario comprises to recognize the first fault scenario as an alternative explanation associated with one or more root causes that led to the set of observed symptoms.

5. The system of claim 1, wherein the database of fault scenarios further comprises one or more confidence levels.

6. The system of claim 5, wherein to refine the plurality of matched fault scenarios further includes associating matched fault scenarios according to relationships.

7. The system of claim 6, wherein the relationships include at least one of the following: symptom relationships, root cause identifier relationships, and confidence level relationships.

8. The system of claim 1 wherein to refine the plurality of matched fault scenarios further comprises to order the plurality of matched fault scenarios according to confidence levels associated with a given matched fault scenario.

9. The system of claim 1, wherein the first fault scenario is determined to be subsumed by the second fault scenario in response to a determination that the first fault scenario is a base scenario and the second fault scenario is a derived scenario from the base scenario.

10. The system of claim 9, wherein it is determined that the first fault scenario is the base scenario and the second fault scenario is the derived scenario from the base scenario, the determination being made in response to the first fault scenario and second matched fault scenario sharing a same root cause identifier and a confidence level of the first fault scenario being lower than a confidence level of the second matched fault scenario.

11. The system of claim 1, wherein in response to a determination that the first fault scenario is an alternative explanation for the second fault scenario, to refine the plurality of matched fault scenarios further comprises to indicate the first fault scenario and the second fault scenario as part of a root cause group.

12. The system of claim 11, wherein the first fault scenario is determined to be the alternative explanation for the second fault scenario in response to the first fault scenario and second fault scenario sharing a same set of symptoms.

13. The system of claim 1, wherein in response to a determination that the first fault scenario is a separate possible fault from the second fault scenario, to refine the plurality of matched fault scenarios further comprises to indicate the first fault scenario and second fault scenario are not part of a same root cause group.

14. The system of claim 13, wherein in response to the first fault scenario and second fault scenario sharing neither a same set of symptoms nor a same root cause identifier, it is determined that the first fault scenario is the separate possible fault from the second fault scenario.

15. The system of claim 1, wherein to determine whether the first fault scenario of the plurality of matched fault scenarios is to be subsumed by the second fault scenario comprises to:
  determine an expression that has the first fault scenario as a parameter and that corresponds to the second fault scenario;
  determine whether the expression satisfies a preset criterion; and
  in response to the expression satisfying the preset criterion, deem the first fault scenario as subsumed by the second fault scenario.

16. The system of claim 1, wherein to match the set of observed symptoms includes to add a partial-match potential fault scenario (PMPFS) that handles partial matches with a matching mechanism.

17. The system of claim 16, wherein to add the PMPFS comprises to allow a potential fault scenario to specify a given symptom as excluding one or more values.

18. The system of claim 16, wherein to add the PMPFS comprises to allow a potential fault scenario to restrict a scope of the PMPFS and its symptoms and correspondingly reduce a probability associated with the PMPFS.

19. The system of claim 16, wherein to add the PMPFS comprises to allow a potential fault scenario to define an aggregate symptom across multiple inputs.

20. The system of claim 16, wherein to add the PMPFS comprises to exclude from the PMPFS a set of back propagated symptoms.

21. The system of claim 20, wherein to add the PMPFS comprises at least one of the following: using a subset of back-propagated symptoms; using an aggregate of back-propagated symptoms; and using exclusion of back-propagated symptom values.

22. The system of claim 1, wherein to match the set of observed symptoms includes to perform an approximate matching.

23. A method, comprising:
  receiving a set of observed symptoms of a physical system;
  matching the set of observed symptoms with a database of fault scenarios to generate a plurality of matched fault scenarios, wherein the database of fault scenarios comprises combinations of symptoms and corresponding root cause identifiers; and
  refining the plurality of matched fault scenarios, comprising:
    determining whether a first fault scenario of the plurality of matched fault scenarios is to be subsumed by a second fault scenario; and
    in response to a determination that the first fault scenario of the plurality of matched fault scenarios is to be subsumed by the second fault scenario: including the second fault scenario in the plurality of matched fault scenarios, deprioritizing the first fault scenario, or both including the second fault scenario in the plurality of matched fault scenarios and deprioritizing the first fault scenario; and
  outputting the plurality of matched fault scenarios as potential root causes.

24. The method of claim 23, wherein:
  the second fault scenario is one of the plurality of matched fault scenarios; and
  the determining of whether the first fault scenario of the plurality of matched fault scenario is to be subsumed by the second fault scenario includes pairwise comparing the plurality of matched fault scenarios.

25. The method of claim 23, wherein the deprioritizing of the first fault scenario comprises removing the first fault scenario from the plurality of matched fault scenarios.

26. The method of claim 23, wherein the deprioritizing of the first fault scenario comprises recognizing the first fault scenario as an alternative explanation associated with one or more root causes that led to the set of observed symptoms.

27. The method of claim 23, wherein the database of fault scenarios also comprises one or more confidence levels.

28. The method of claim 27, wherein the refining of the plurality of matched fault scenarios further includes associating matched fault scenarios according to relationships.

29. The method of claim 28, wherein the relationships include at least one of the following: symptom relationships, root cause identifier relationships, and confidence level relationships.

30. The method of claim 23, wherein the refining of the plurality of matched fault scenario further comprises ordering the plurality of matched fault scenarios according to confidence levels associated with a given matched fault scenario.

31. The method of claim 23, wherein the first fault scenario is determined to be subsumed by the second fault scenario in response to a determination that the first fault scenario is a base scenario and the second fault scenario is a derived scenario from the base scenario.

32. The method of claim 31, wherein it is determined that the first fault scenario is the base scenario and the second fault scenario is the derived scenario from the base scenario, the determination being made in response to the first fault scenario and second matched fault scenario sharing a same root cause identifier and a confidence level of the first fault scenario being lower than a confidence level of the second matched fault scenario.

33. The method of claim 23, wherein in response to the first fault scenario being determined to be an alternative explanation for the second fault scenario, the refining of the plurality of matched fault scenario further comprises indicating the first fault scenario and second fault scenario as part of a root cause group.

34. The method of claim 33, wherein the first fault scenario is determined to be the alternative explanation for the second fault scenario in response to the first fault scenario and second fault scenario sharing a same set of symptoms.

35. The method of claim 23, wherein in response to a determination that the first fault scenario is a separate possible fault from the second fault scenario, the refining of the plurality of matched fault scenario further comprises indicating the first fault scenario and second fault scenario are not part of a same root cause group.

36. The method of claim 35, wherein in response to the first fault scenario and second fault scenario sharing neither a same set of symptoms nor a same root cause identifier, it is determined that the first fault scenario is the separate possible fault from the second fault scenario.

37. The method of claim 23, wherein the refining of the plurality of matched fault scenarios further comprises:
   determining an expression that has the first fault scenario as a parameter and that corresponds to the second fault scenario;
   determining whether the expression satisfies a preset criterion; and
   in response to the expression satisfying the preset criterion, deeming the first fault scenario as subsumed by the second fault scenario.

38. The method of claim 23, wherein the matching of the set of observed symptoms includes adding a PMPFS that handles partial matches with a matching mechanism.

39. The method of claim 38, wherein the adding of the PMPFS comprises allowing a potential fault scenario to specify a given symptom as excluding one or more values.

40. The method of claim 38, wherein the adding of the PMPFS comprises allowing a potential fault scenario to restrict a scope of the PMPFS and its symptoms and correspondingly reduce probability associated with the PMPFS.

41. The method of claim 38, wherein the adding of the PMPFS comprises allowing a potential fault scenario to define an aggregate symptom across multiple inputs.

42. The method of claim 38, wherein the adding of the PMPFS comprises excluding from the PMPFS a set of back propagated symptoms.

43. The method of claim 42, wherein adding of the PMPFS comprises at least one of the following: using a subset of back-propagated symptoms; using an aggregate of back-propagated symptoms; and using exclusion of back-propagated symptom values.

44. A computer program product, the computer program product being embodied in a non-transitory computer readable storage medium and comprising computer instructions for:
   receiving a set of observed symptoms of a physical system;
   matching the set of observed symptoms with a database of fault scenarios to generate a plurality of matched fault scenarios, wherein the database of fault scenarios comprises combinations of symptoms and corresponding root cause identifiers; and
   refining the plurality of matched fault scenarios, comprising:
      determining whether a first fault scenario of the plurality of matched fault scenarios is to be subsumed by a second fault scenario; and
      in response to a determination that the first fault scenario of the plurality of matched fault scenarios is to be subsumed by the second fault scenario: including the second fault scenario in the plurality of matched fault scenarios, deprioritizing the first fault scenario, or both including the second fault scenario in the plurality of matched fault scenarios and deprioritizing the first fault scenario; and
   outputting the plurality of matched fault scenarios as potential root causes.

* * * * *

UNITED STATES PATENT AND TRADEMARK OFFICE
CERTIFICATE OF CORRECTION

PATENT NO. : 10,949,285 B2
APPLICATION NO. : 16/358513
DATED : March 16, 2021
INVENTOR(S) : David R. Cheriton It is certified that error appears in the above-identified patent and that said Letters Patent is hereby corrected as shown below:

In the Claims

In Column 20, Line(s) 47, Claim 8, after "claim 1", insert --,--.

Signed and Sealed this
Twenty-eighth Day of June, 2022

Katherine Kelly Vidal
*Director of the United States Patent and Trademark Office*